Figure 1A:
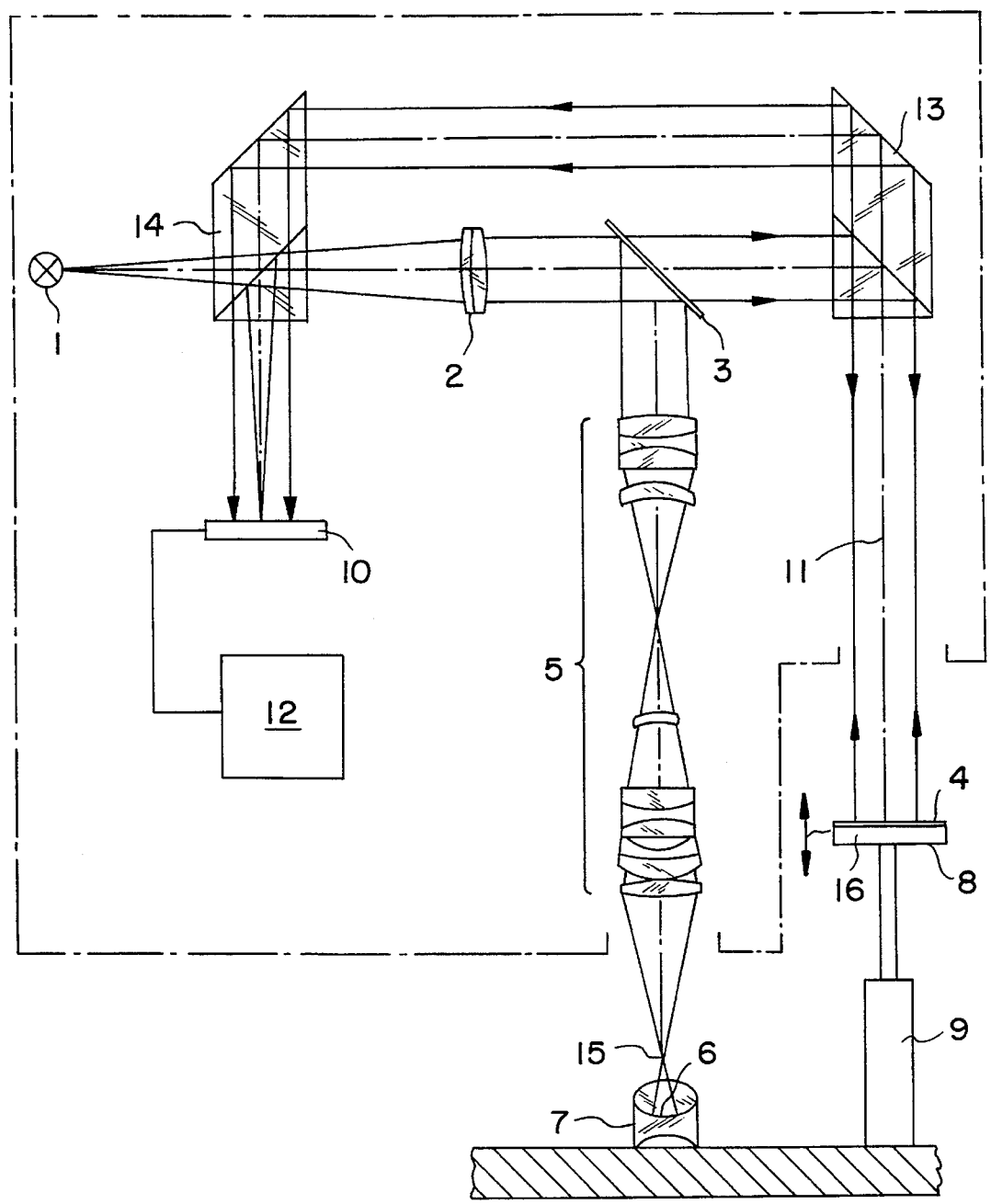
Figure 1B:
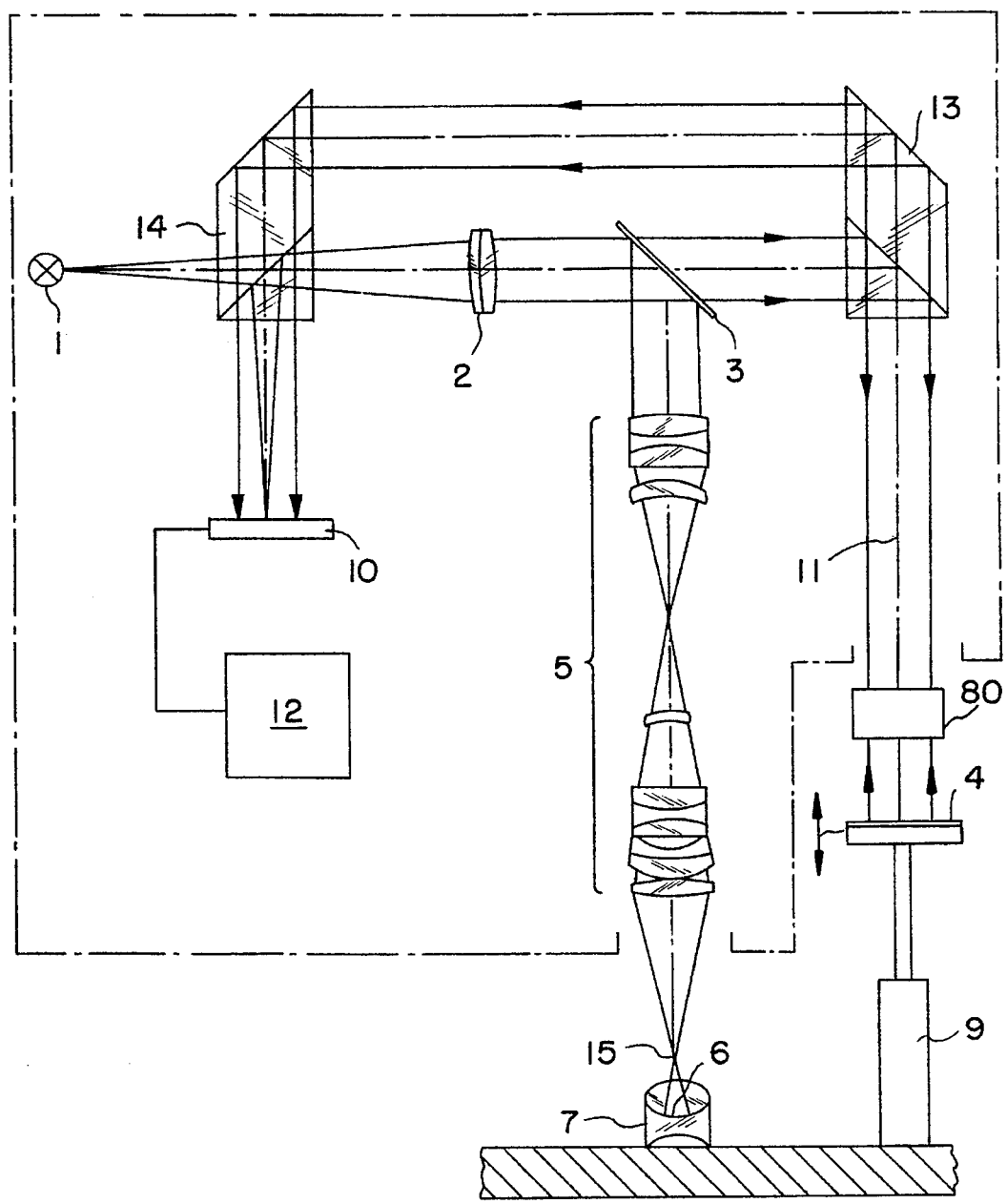
Figure 1C:
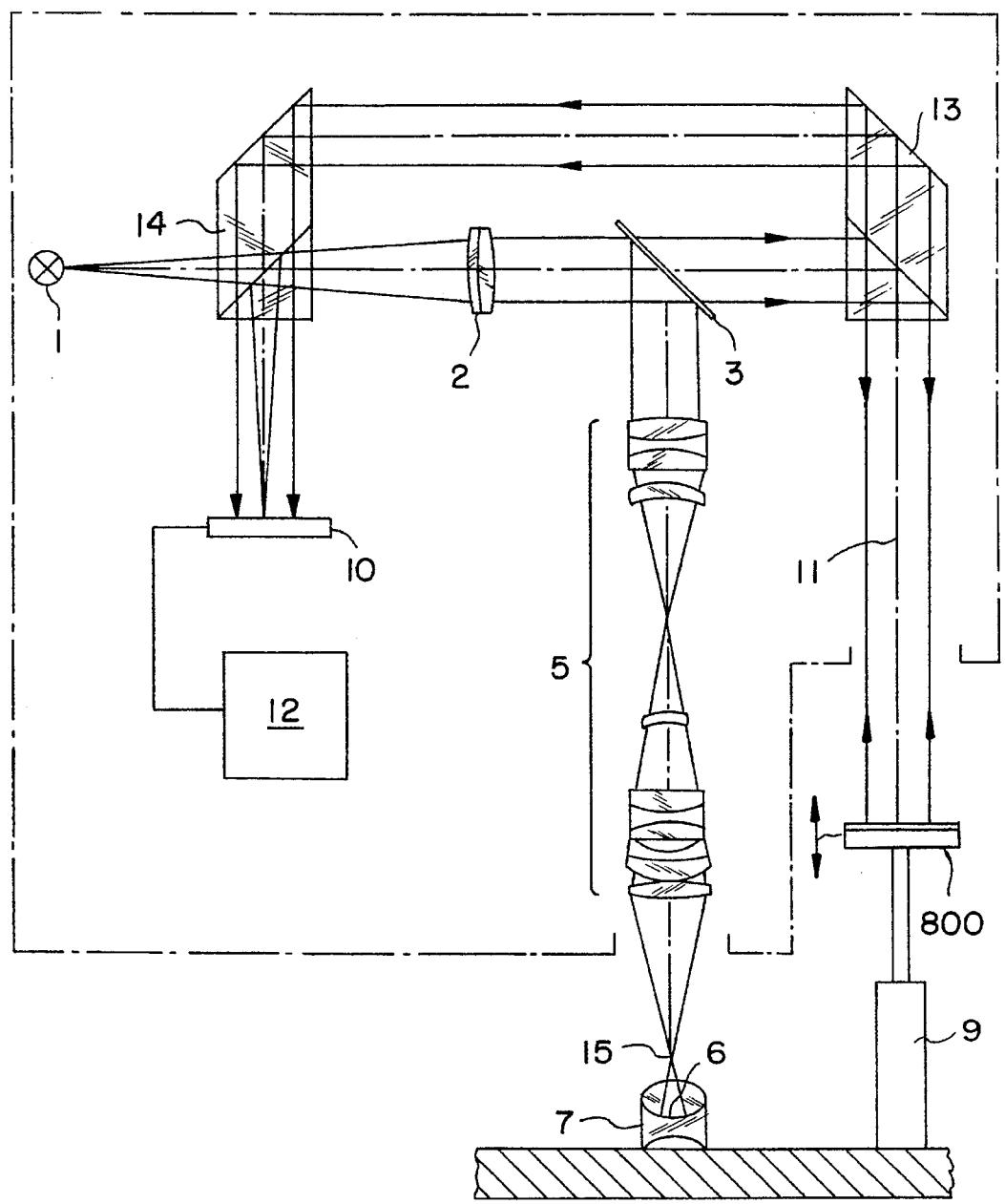

United States Patent [19]

Gaechter et al.

[11] Patent Number: 5,519,491
[45] Date of Patent: May 21, 1996

[54] PROCESS FOR MEASURING THE INCLINATION OF BOUNDARY AREAS IN AN OPTICAL SYSTEM USING INTERFEROMETRY TO EXTRACT REFLECTIONS FROM DISTURBANCE-GENERATING BOUNDARY AREAS

[75] Inventors: Bernhard Gaechter, Balgach; Bernhard Braunecker, Rebstein, both of Switzerland

[73] Assignee: Leica AG, Heerbrugg, Switzerland

[21] Appl. No.: 211,174

[22] PCT Filed: Oct. 30, 1992

[86] PCT No.: PCT/EP92/02497

§ 371 Date: Mar. 23, 1994

§ 102(e) Date: Mar. 23, 1994

[87] PCT Pub. No.: WO93/09395

PCT Pub. Date: May 13, 1993

[30] Foreign Application Priority Data

Oct. 31, 1991 [DE] Germany ............... 41 35 959.3

[51] Int. Cl.$^6$ ............... G01B 9/02; G01B 11/02; G01B 11/00
[52] U.S. Cl. ............... 356/349; 356/358; 356/359; 356/363
[58] Field of Search ............... 356/357, 358, 356/363, 359, 360, 349

[56] References Cited

U.S. PATENT DOCUMENTS

| | | | |
|---|---|---|---|
| 4,398,824 | 8/1983 | Feldman et al. | 356/401 |
| 4,422,764 | 12/1983 | Eastman | 356/357 |
| 4,746,216 | 5/1988 | Sommargren | 356/363 |
| 5,227,861 | 7/1993 | Nishizawa et al. | 356/357 |
| 5,321,501 | 6/1994 | Swanson et al. | 356/345 |
| 5,341,205 | 8/1994 | McLandrich et al. | 356/357 |

FOREIGN PATENT DOCUMENTS

| | | |
|---|---|---|
| 0253242A2 | 1/1988 | European Pat. Off. . |
| 0235861 | 11/1990 | European Pat. Off. . |
| 2528209 | 12/1976 | Germany . |

*Primary Examiner*—Frank Gonzalez
*Assistant Examiner*—Jason D. Eisenberg
*Attorney, Agent, or Firm*—Foley & Lardner

[57] ABSTRACT

The description relates to the measurement of the inclination of boundary areas in an optical system and a device for implementing the process. Starting with an auto-collimation process which determines the inclination of this boundary area in relation to a reference axis from the deviation of a light beam collimated onto the boundary area to be investigated and reflected on a position-sensitive photodetection system, a twin-beam interferometer process with downstream evaluation electronics is provided which permits the separation of the interferogram, intensity-modulated according to the invention, of the boundary area to be investigated from the unmodulated disturbance reflections of those not to be investigated as far as the interferogram intensities in the photon-noise range and thus offers a resolution in the deviation of the center of gravity of the interferogram of the order of 10 nm. To modulate the intensity of the interferogram, the difference in the optical distance between the reference and test beams to the boundary area to be investigated is time-modulated.

14 Claims, 3 Drawing Sheets

PROCESS FOR MEASURING THE INCLINATION OF BOUNDARY AREAS IN AN OPTICAL SYSTEM USING INTERFEROMETRY TO EXTRACT REFLECTIONS FROM DISTURBANCE-GENERATING BOUNDARY AREAS

BACKGROUND OF THE INVENTION

The invention relates to a process and a device for the measurement of the inclination of boundary areas in an optical system with respect to a reference axis.

A device of this type is disclosed in EP-A2 0,253,242. In the device described in that document, a light beam which is emitted from a light source and which is bounded by a diaphragm is collimated by an optical imaging system onto a boundary area which is to be investigated and the inclination of which in relation to a reference axis is to be determined. The wavefront, reflected by the boundary area on which it is collimated, is imaged by the same optical imaging system onto a position-sensitive photodetection system. From its position-dependent output signals, an electronic evaluation system determines the deviation of the diaphragm image reflected by the boundary area to be investigated in relation to the reference axis, and thus the inclination of the boundary area to be investigated in relation to the reference axis. In the described device, a CCD line sensor is employed as a position-sensitive photodetection system. A special threshold value circuit is provided, in order to separate the measurement signals associated with the diaphragm image from the heterodyned disturbance radiation signals.

In place of the line sensor, it is also possible to use a four-quadrant diode or a lateral diode, as is realized in the electronic auto-collimator UDT model 1000 from the company United Detector Technology.

A disadvantage in the case of the measurement of the inclination of boundary areas using auto-collimators occurs in the case of low-reflection boundary areas, since in this case the position of the diaphragm image can no longer be reliably measured, as a result of the poor contrast. Likewise, the method proves to be critical where radii centers of various boundary areas lie closely one behind the other. In these circumstances, the boundary areas with the adjacent radii centers disturb the measurement as a result of extraneous light. There is even the danger of the confusion of the boundary area to be investigated with a boundary area which is not to be investigated, i.e. an unambiguous correlation of the diaphragm reflection with a specified boundary area is not possible.

SUMMARY OF INVENTION

The object of the invention is to provide a process and a device for measuring the inclination of boundary areas in an optical system, which process and device permit an unambiguous separation of the reflection of the boundary area to be investigated from the disturbing reflections of the boundary areas which are not to be investigated, permit a detection of the reflection intensity down to the limit of the photon noise, and offer a resolution of the deviation of the reflection from a reference axis in the order of magnitude of 10 nm.

In the case of a process of the initially mentioned type, this object is achieved according to the invention by providing a method of measuring inclinations of boundary areas in an optical system, in which a light beam is collimated onto a boundary area which is to be investigated in each instance and, from a deviation of a wavefront reflected by the boundary area to be investigated in relation to a reference axis on a position-sensitive photodetection system, the inclination of the boundary area to be investigated in each instance in relation to the reference axis is determined. The method includes the steps of: a) splitting the light beam into a test beam and a reference beam; b) guiding the reference beam via a reference beam path onto a reference mirror; c) adjusting an optical path length of the reference beam to a same optical path length as the test beam as far as the boundary area to be investigated in each instance; d) selecting the coherence length of the light beam to be shorter than a shortest optical path length between the boundary area to be investigated in each instance and the closest disturbance-reflection-generating boundary area of the optical system; e) time-modulating the optical path length difference between the reference beam and the test beam as far as the boundary area to be investigated with a range of modulation not greater in magnitude than the coherence length; f) imaging a wavefront reflected by the boundary area to be investigated in each instance onto the position-sensitive photodetection system where it is heterodyned with a wavefront reflected by the reference mirror, thereby producing on the position-sensitive photodetection system a temporally intensity-modulated interferogram; and g) electronically evaluating position-dependent

* * * * *

# United States Patent Office

PTO - BOYERS, PA Duty Station

MISSING PAGE TEMPORARY NOTICE

PATENT # 5519491     FOR ISSUE DATE 5-21-96

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Columns 3-4 to end

Data Conversion Operation
Boyers, Pa